UNITED STATES PATENT OFFICE.

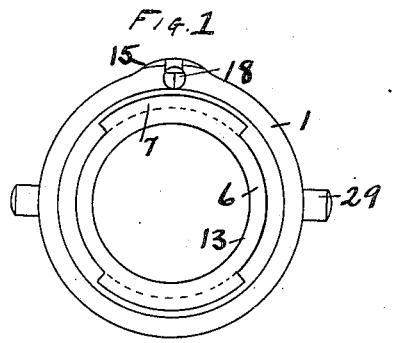
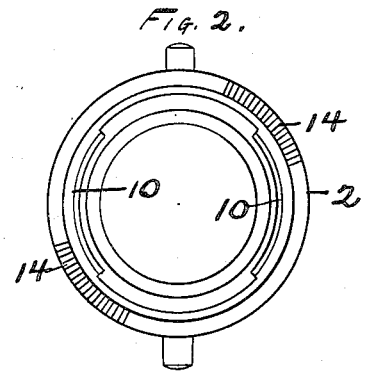
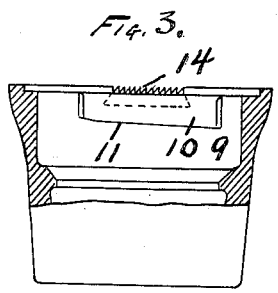
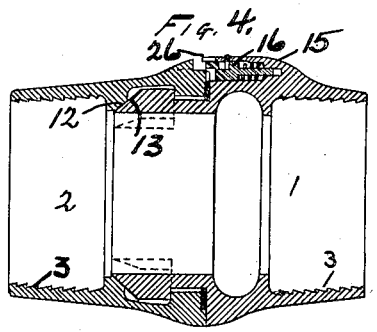
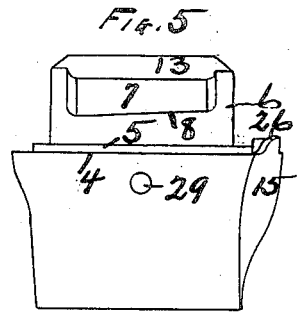
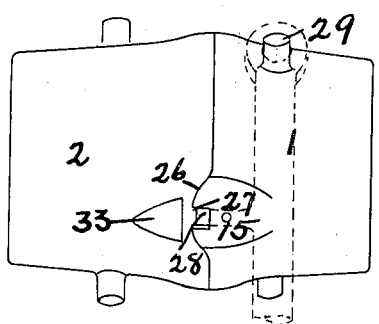
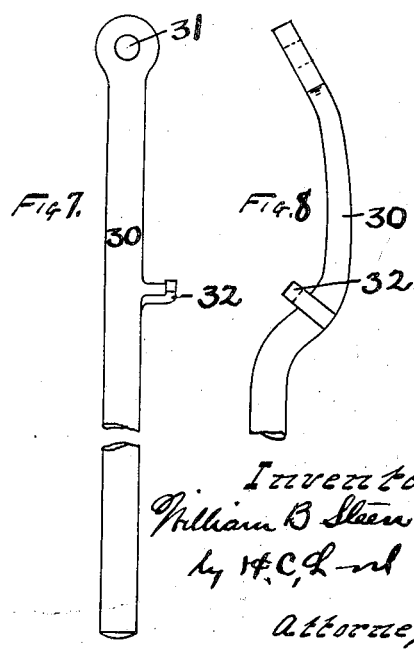
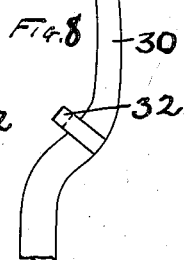

WILLIAM BURTON STEEN, OF MILLCREEK TOWNSHIP, ERIE COUNTY, PENNSYLVANIA.

HOSE-COUPLING.

No. 898,017.  Specification of Letters Patent.  Patented Sept. 8, 1908.

Application filed January 25, 1907. Serial No. 354,017.

*To all whom it may concern:*

Be it known that I, WILLIAM B. STEEN, a citizen of the United States, residing in Millcreek township, in the county of Erie and State of Pennsylvania, have invented new and useful Improvements in Hose-Couplings, of which the following is a specification.

This invention relates to hose couplings and consists in certain improvements in the construction thereof as will be hereinafter fully described and pointed out in the claim.

The object of the invention is to make a quick acting hose coupling which when coupled, is locked in position; to make a more perfect joint when the couplings are together and provide means by which the coupling may be readily unlocked and uncoupled.
The invention is illustrated in the accompanying drawings as follows: Figure 1 is an end view of the male member of the coupling. Fig. 2, an end view of the female member of the coupling. Fig. 3, a central sectional view of the female member of the coupling. Fig. 4, a central section through the coupling, the members being interlocked. Fig. 5, a side elevation of the male member of the coupling. Fig. 6, a side elevation of the members coupled. Fig. 7, a top view of the spanner wrench for operating the coupling. Fig. 8, a side elevation of the same. Fig. 9, a large section of the locking pawl.

1 marks the male member of the coupling;
2 the female member. These are provided with the corrugated surfaces 3 for facilitating the fastening of the hose to the coupling. The male member has the shoulder 4 against which a gasket 5 is arranged. A tubular projection 6 is provided with the cam lug 7 having the cam surface 8. There are preferably two of these cam lugs 7 and each point of the cam surfaces 8 of the lugs 7 are in the same line, extending through the axis of the coupling and at right angles to the axis. The female member has the socket 9 in which there are the inwardly extending lines 10 with the cam surfaces 11 arranged to operate on the cam surfaces 8. By having the same axial arrangement of the cam surfaces 8 on both lugs 7 and a similar arrangement on the lugs 10, the coupling can be made with either lug 10 on either lug 7.

I prefer to supplement the joint formed with the gasket 5 which is between the shoulder and the male member on the end of the female member by a metallic joint preferably a conical joint. This is effected by making the seat 12 on the female member and a seat 13 on the male member. These can be brought into contact after the gasket 5 has been somewhat compressed.

I provide a set of ratchet teeth 14 on one member, as shown on the female member and on the other member, as shown in the male member, I arrange a ratchet pawl for operating on these teeth. The ratchet pawl is arranged in a protuberance 15 extending from the surface of the male member. A socket 16 is arranged in this protuberance and in this socket the pawl 18 is placed. The pawl has the stem 19 extending from it. This stem extends into the socket 20, the socket 20 opening into the socket 16. A spring 22 is positioned between the shoulder 21 and the end of the socket 16 and tends to crowd the pawl outwardly. A socket 23 is arranged on the upper face of the pawl and a screw 24 extends into this socket and locks the pawl in the socket 16. The pawl is provided with a beveled surface 25 so that operating with the beveled ratchet teeth, the members may be readily turned to place, the beveled surfaces operating one upon the other during this movement and actuating the pawl. The pawl prevents, however, a return or loosening movement of the members by reason of the straight face of the pawl operating against the straight face of the ratchet teeth. The protuberance 15 has an over-hanging lip 26 which acts as a guard for preventing the pawl from getting accidental thrusts. This is important when used with fire hose when the uncoupling would be a serious matter. A slot 27 is made in the over-hanging lip through which an instrument may be extended for operating the pawl for unlocking the coupling. The pawl has the end 28 extending into this slot for this purpose.

The coupling is provided with a spanner post 29 and a spanner wrench 30 is provided with the perforations 31 which is adapted to engage the post 29. A finger 32 extends from the wrench and is so distanced from the perforation 31 and so shaped that when the wrench is placed on the post 29, the post extending through the perforations 31, the finger 32 is in position to enter the slot 27 against the end 28 of the pawl, so that by longitudinal movement of the spanner wrench, the pawl may be first moved to unlock the coupling and by a rotating movement of the wrench the members may be uncoupled.

I prefer to provide a guard lug 33 in front of the slot 28 as a further means of protection against accidental movement of the pawl.

What I claim as new is:

In a hose coupling mechanism the combination with the male and female fittings having interlocking cams adapted to be interlocked by the relative axial and rotative movements of the members; of a locking device comprising ratchet teeth on one of the members and a pawl arranged to move in an axial direction on the other of said members for holding the fittings in interlocked position; a spanner wrench having means for engaging one of said fittings and having devices thereon for actuating the pawl by direct engagement of the operative end of the pawl and movement in an axial direction while in engagement with the fitting.

In testimony whereof I have hereunto set my hand in the presence of two subscribing witnesses.

WILLIAM BURTON STEEN.

Witnesses:
BESSIE F. PARKER,
WM. C. SOMMERS.